July 5, 1932.    O. C. LARSON    1,866,115
MEANS FOR CONVERTING A SLED INTO A WHEELED VEHICLE
Filed Nov. 4, 1930    2 Sheets-Sheet 1
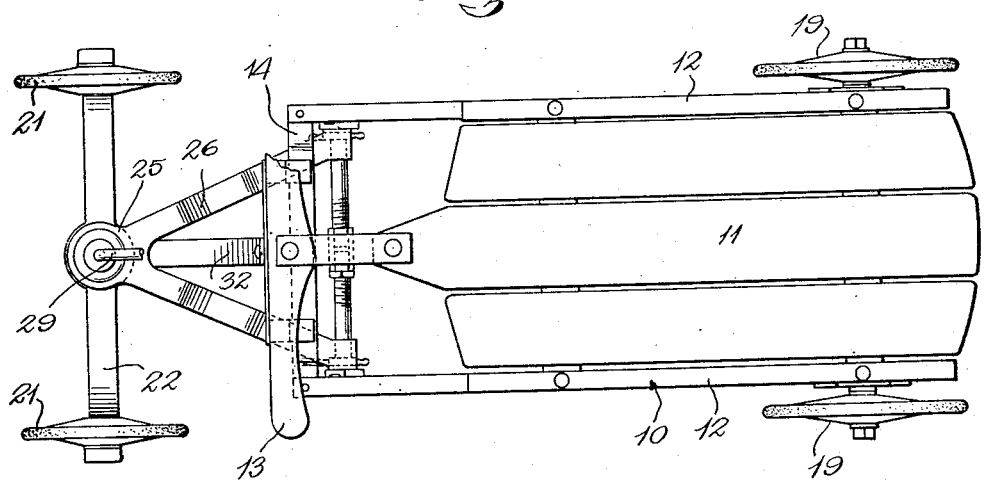
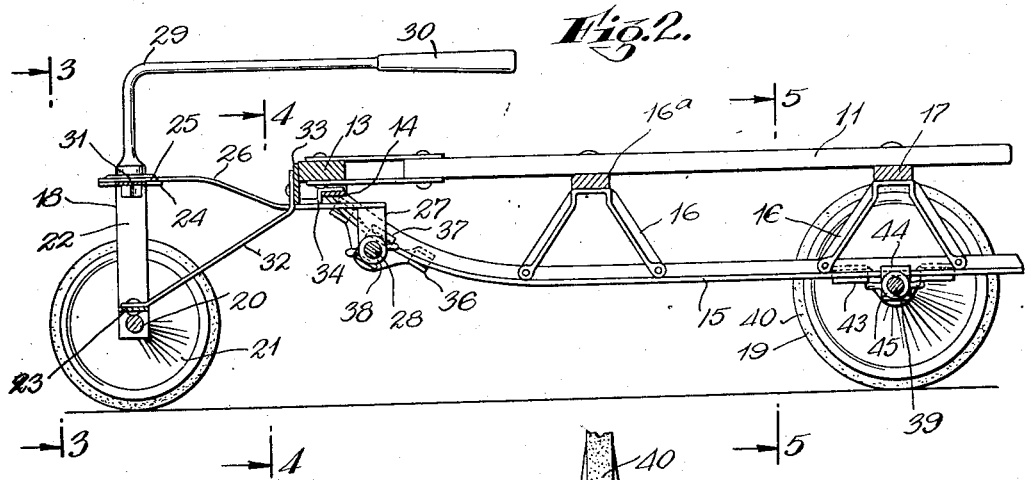
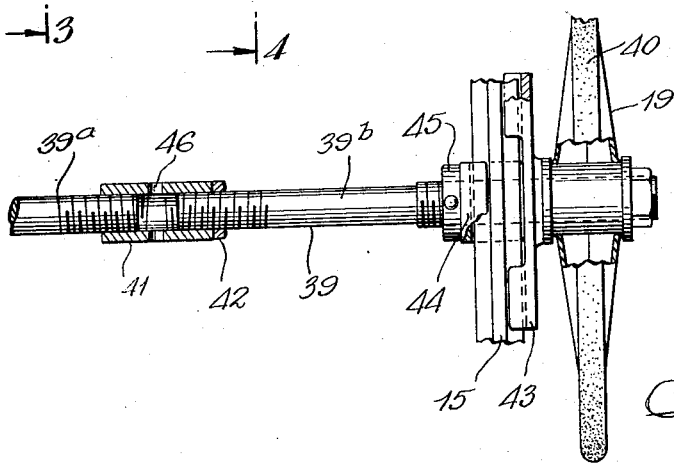
INVENTOR.
OTTO C. LARSON
ATTORNEY July 5, 1932.  O. C. LARSON  1,866,115
MEANS FOR CONVERTING A SLED INTO A WHEELED VEHICLE
Filed Nov. 4, 1930  2 Sheets-Sheet 2
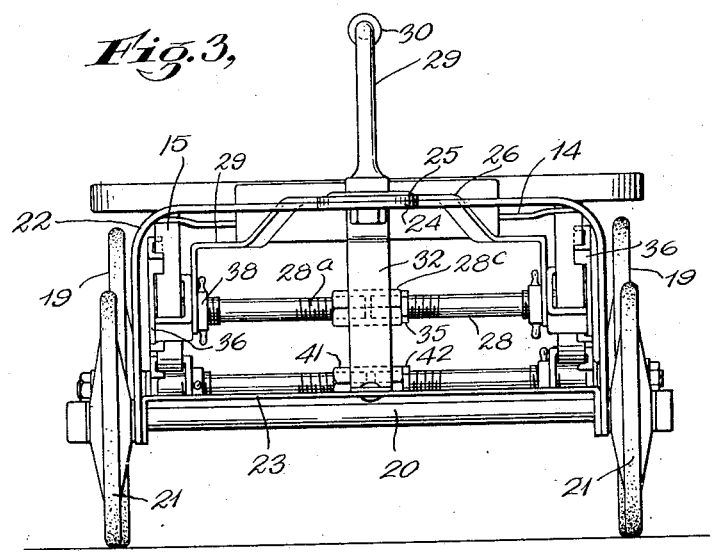
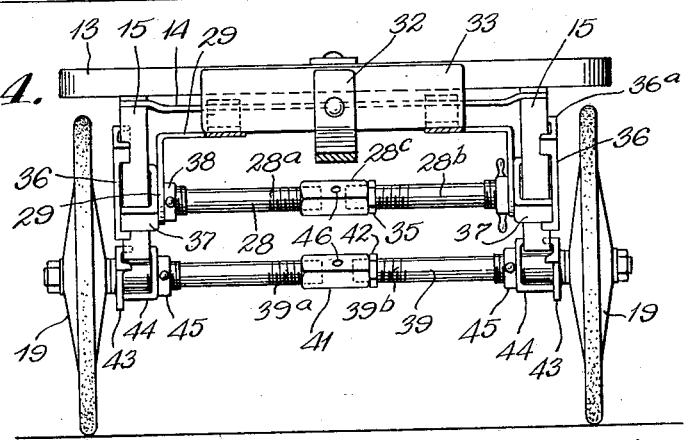
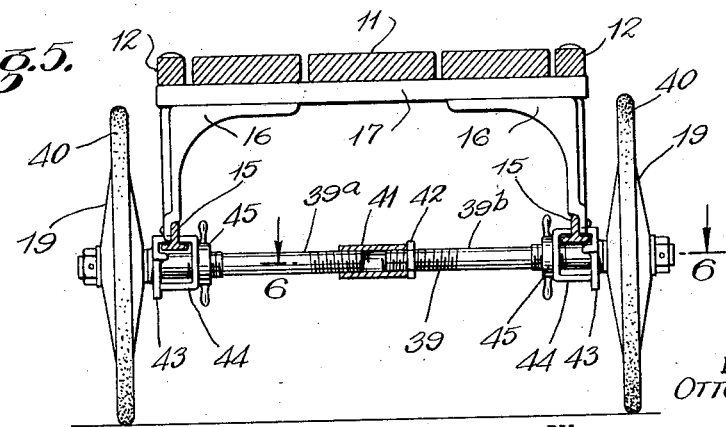
INVENTOR.
OTTO C. LARSON
BY
ATTORNEY Patented July 5, 1932

1,866,115

UNITED STATES PATENT OFFICE

OTTO C. LARSON, OF BROOKLYN, NEW YORK

MEANS FOR CONVERTING A SLED INTO A WHEELED VEHICLE

Application filed November 4, 1930. Serial No. 493,257.

This invention relates to an apparatus involving two wheel units provided with means for quickly clamping the same in connection with a sled of conventional form to convert the sled into a wheeled vehicle, thus providing two uses therefor; and the object of the invention is to provide two wheel units, each unit having means for quickly attaching and detaching the same with the framework of a sled of conventional form and for reinforcing that part of the sled in connection with which the units are coupled; a further object being to provide one of the wheel units with means for steering the wheels thereof to control the progress of the vehicle over a roadway or other surface; a further object being to provide wheel units of the class specified which may be attached and detached with respect to a sled without the use of special tools or implements of any kind or class; and with these and other objects in view, the invention consists in a convertible vehicle of the class specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a plan view of a complete vehicle made according to my invention with part of the construction broken away.

Fig. 2 is a side and sectional view of the structure shown in Fig. 1.

Fig. 3 is a view looking in the direction of the arrows 3—3 of Fig. 2.

Fig. 4 is a section on the line 4—4 of Fig. 2.

Fig. 5 is a section on the line 5—5 of Fig. 2; and,

Fig. 6 is an enlarged, sectional view on the line 6—6 of Fig. 5.

For the purpose of illustrating one method of carrying my invention into effect, I have shown in the accompanying drawings, a sled 10 of conventional form and consisting of a top seat portion 11, side rails 12, a front steering bar 13 arranged above a cross bar 14 joining the front ends of the rails 12 and the front upwardly directed ends of the runners 15, the latter being supported by handle shaped bracket members 16 and 17 coupled with cross bars 16a and 17a upon which the seat 11 is supported. The conventional runners 15 are T-shaped in cross sectional form as clearly seen in Fig. 5 of the drawings, the crosshead of the T forming the runner proper, the central flange being directed upwardly.

In carrying my invention into effect, I provide two wheel units 18 and 19 which are detachably coupled with respect to the sled 10 to convert said sled into a wheeled vehicle. The unit 18 consists of an axle 20 upon the outer ends of which are rotatably mounted wheels 21. Said axle is supported by a frame consisting of a U-shaped or yoke-shaped portion 22 and a transverse bar 23. The latter is arranged adjacent the axle 20 whereas the crosshead of the yoke-shaped portion is disposed above and in spaced relation to the bar 23 and has a central disk-shaped bearing portion 24 upon which rests a corresponding disk-shaped portion 25 of a V-shaped brace frame 26, the side arms of which extend backwardly in divergent fashion and terminate in downwardly extending bearing members 27 mounted upon a tie or clamp rod 28.

Secured to the yoke-shaped frame 22 is a steering rod 29 which extends upwardly and backwardly above the top of the sled when the unit 18 is coupled therewith and terminates in a hand grip 30 by means of which the front wheels 21 may be revolved upon the axis 31 formed in the disk-shaped portion 25 of the frame 26. A brace member 32 is coupled with the bar 23 in vertical alinement with the axis 31 and extends upwardly and is coupled with a front bearing plate 33 adapted to rest upon the front face of the steering bar 13 of the sled.

The plate 33 has at its end portions upwardly and backwardly extending clips 34, the latter being riveted, welded or otherwise secured to the side arms of the frame 26 so that the plate 33 as well as the brace member 32 constitutes a unit part of the frame 26 as will be apparent. The clips 34 are adapted to be arranged over the cross bar 14 so as to reinforce the support of the unit 18 in connection with the front end of the sled, especially in lifting the entire vehicle.

The clamp rod 28 is in the form of two left and right hand threaded members 28a and 28b coupled together by a turn buckle 28c, the purpose of which is to lengthen and shorten the length of the rod 28 in the operation of applying the unit 18 to the sled or detaching the same therefrom. When attached, a lock nut 35 is employed to retain the parts against accidental displacement.

Supported upon the outer ends of the rod parts 28a—28b are clamp plates 36, the ends of which have U-shaped portions 36a which fit above and below the crosshead of the runners 15 and engage the outer sides of said runners and the upwardly extending flange thereof in drawing said clamp plates inwardly by the operation of the turn buckle 28c.

When the plates 36 are properly placed on the runners, other U-shaped clamps 37 on said rods are moved outwardly into engagement with the inner surfaces of the runners 15, also cooperating with the plates 36 to lock the rod 28 in connection with the runners 15. The clamps 37 are held in position by winged or other nuts 38, which also serve to clamp the downwardly directed bearing portions 27 of the frame 26 in position on said rod. At this time, it will be understood that the tightening of the nuts 38 merely serves to securely clamp the unit 28 to the runners 15, the outward pressure being taken up by the outer clamp plates 36, thus preventing any tendency to spread the runners. When the unit 28 has been attached, it will be understood that the clamp rod 28 including the clamps 36 and 37 will operate to reinforce and strengthen the front end portion of the sled.

The wheel unit 19 is clamped to the runners 15 in the same manner as the rod 28 is coupled with said runners, the only difference being that the clamp rod 39 employed in the unit 19 consists of separate parts 39a and 39b which serve at their outer ends as axles for the wheels 40 of the unit 19.

The separate parts 39a and 39b have left and right hand threads coupled together by a turn buckle 41, a lock nut 42 being employed to retain said parts in different positions of adjustment. Each part 39a—39b of the rod 39 has, inwardly of the wheel 40, a clamp plate 43 similar to the clamp plate 36 and another companion clamp 44 similar to the clamps 37. The clamp plates 43 are disposed on the outer sides of the runners 15 and the clamps 44 on their inner sides, winged nuts 45 being employed to lock the wheel unit 19 in position on the runners. It will be understood that the rod 39 which forms an axle for the wheels 40 also serves to reinforce and strengthen the rear portion of the sled to which the unit 19 is coupled. Thus, the sled is materially strengthened in its use as a seat frame in the conversion of the sled into the wheel vehicle. It will be understood that the rods 39 are free to rotate in the clamp plates 43, and these clamp plates are moved inwardly into engagement with the runners 15 by the wheels 19, which are drawn inwardly in the operation of the turn buckle 41.

It will be apparent that no tools or implements are required in coupling and uncoupling the separate wheel units 18 and 19 with the sled, except possibly in the use of a nail or similar small tool which may be passed through the apertures 46, provided in the turn buckles 28c and 41, in order to tighten up or loosen said turn buckles should the same fail to operate freely by hand. By providing the winged nuts 38 and 45, these may be readily tightened and loosened by hand.

It will therefore be seen that the units 18 and 19 may be quickly and easily attached and detached. It will also be apparent that the clamp plate 43 of the wheel unit 19 is disposed between the side arms of the angular bracket member 17 so as to key the unit 19 against possible shifting on the runners, whereas the clips 34 and plate 33 serve to key the unit 18 against shifting on said runners. The plate 33 also reinforces the front wheels in the event that they strike an obstruction, so that the shock may be distributed directly to the framework of the sled.

It will be understood that my improved wheel units may be sold in conjunction with or independently of a sled, so as to provide a dual use for the sled frame structure. By providing the turn buckle construction, the units will be adaptable for mounting upon sleds having runners of slightly varying spaced relation with respect to each other, thus adapting the wheel units to sleds of various sizes such as commonly placed upon the market. The length of the sled governs the size of the wheeled vehicle constructed.

It will be understood that while I have shown certain details of construction for carrying my invention into effect, that I am not necessarily limited to these details, and various changes in and modifications of the construction herein shown and described, may be made within the scope of the appended claims without departing from the spirit of my invention or sacrificing its advantages.

Having fully described my invention, what I claim as new and desire to secure by Letters Patent, is:

1. The combination with a sled of conventional form including side runners, of two wheel units each consisting of a pair of wheels including a coupling shaft for converting the sled into a wheeled vehicle, means at the end portions of the shafts of each unit for detachably clamping the same in connection with the runners of the sled, said clamping means comprising relatively adjustable jaw members adjustable on the shafts of said units and movable relatively to each other, and one of said units including a wheel axle shaft disposed in spaced relation to the first named shaft and forwardly of said sled.

2. The combination with a sled of conventional form including side runners, of two wheel units each consisting of a pair of wheels including a coupling shaft for converting the sled into a wheeled vehicle, means at the end portions of the shafts of each unit for detachably clamping the same in connection with the runners of the sled, said clamping means comprising relatively adjustable jaw members adjustable on the shafts of said units and movable relatively to each other, one of said units including a wheel axle shaft disposed in spaced relation to the first named shaft and forwardly of said sled, a frame coupling the shafts of said unit together and said frame including means engaging the forward part of the sled to aid in clamping and alining said unit in connection therewith.

3. The combination with a sled of conventional form including side runners, of two wheel units each consisting of a pair of wheels including a coupling shaft for converting the sled into a wheeled vehicle, means at the end portions of the shafts of each unit for detachably clamping the same in connection with the runners of the sled, said clamping means comprising relatively adjustable jaw members adjustable on the shafts of said units and movable relatively to each other, one of said units including a wheel axle shaft disposed in spaced relation to the first named shaft and forwardly of said sled, a frame coupling the shafts of said unit together and said frame including means engaging the forward part of the sled to aid in clamping and alining said unit in connection therewith, and said frame including a steering post in operative engagement with the wheel axle shaft of said unit.

4. The combination with a sled of conventional form, of two wheel units for converting the sled into a wheeled vehicle, means on each unit for detachably supporting the same in connection with the sled, said means comprising transverse rods disposed between the runners of the sled and clamping means at the end portions of said rods adapted to be coupled with said runner, the rod of one of said units extending beyond the runners to form wheel axles, a wheel supporting frame coupled with the rod of the other unit and extending forwardly of the sled, a wheel axle, and wheels pivotally supported in connection with the forward end of said frame.

5. The combination with a sled of conventional form, of two wheel units for converting the sled into a wheeled vehicle, means on each unit for detachably supporting the same in connection with the sled, said means comprising transverse rods disposed between the runners of the sled and clamping means at the end portions of said rods adapted to be coupled with said runner, the rod of one of said units extending beyond the runners to form wheel axles, a wheel supporting frame coupled with the rod of the other unit and extending forwardly of the sled, a wheel axle, and wheels pivotally supported in connection with the forward end of said frame, and means on the forward end of the frame for steering the wheels of the last named unit.

6. The combination with a sled of conventional form, of two wheel units for converting the sled into a wheeled vehicle, means on each unit for detachably supporting the same in connection with the sled, said means comprising transverse rods disposed between the runners of the sled and clamping means at the end portions of said rods adapted to be coupled with said runner, the rod of one of said units extending beyond the runners to form wheel axles, a wheel supporting frame coupled with the rod of the other unit and extending forwardly of the sled, a wheel axle and wheels pivotally supported in connection with the forward end of said frame, means on the forward end of the frame for steering the wheels of the last named unit, and said frame including means independent of said rod for engaging the framework of the sled in supporting the frame in connection therewith.

7. The combination with a sled of conventional form, of two wheel units for converting the sled into a wheeled vehicle, means on each unit for detachably supporting the same in connection with the sled, said means comprising transverse rods disposed between the runners of the sled and clamping means at the end portions of said rods adapted to be coupled with said runner, the rod of one of said units extending beyond the runners to form wheel axles, a wheel supporting frame coupled with the rod of the other unit and extending forwardly of the sled, a wheel axle and wheels pivotally supported in connection with the forward end of said frame, means on the forward end of the frame for steering the wheels of the last named unit, said frame including means independent of said rod for engaging the framework of the sled in supporting the frame in connection therewith, 13.

and a front plate abutting the front end of the sled.

8. The combination with a sled of conventional form, of two wheel units for converting the sled into a wheeled vehicle, means on each unit for detachably supporting the same in connection with the sled, said means comprising transverse rods disposed between the runners of the sled and clamping means at the end portions of said rods adapted to be coupled with said runner, the rod of one of said units extending beyond the runners to form wheel axles, a wheel supporting frame coupled with the rod of the other unit and extending forwardly of the sled, a wheel axle and wheels pivotally supported in connection with the forward end of said frame, means on the forward end of the frame for steering the wheels of the last named unit, said frame including means independent of said rod for engaging the framework of the sled in supporting the frame in connection therewith, and said frame comprising forwardly converging top frame members extending from the end portions of the shaft of said unit, and a forwardly and downwardly extending central member.

9. The herein described means of converting a sled into a wheeled vehicle comprising two wheel units, adjustable means for detachably supporting each unit to a sled, one of said units comprising a converging frame projecting forwardly of the sled and means for movably supporting an axle shaft and wheels in connection with the front converged end of the frame to dispose said wheels forwardly of the sled and to permit steering movement of said wheels in the operation of steering the vehicle, and the means on said first named unit for adjustably and detachably engaging the sled, comprising a transversely adjustable shaft in connection with which the frame of said unit is supported.

10. An apparatus of the class described comprising two wheel units, each of said units involving a clamp rod, means for increasing and decreasing the length of said rod, adjustable means at the end portions of said rod for clamping the same in connection with a suitable support, the rods of one of said units terminating at its ends in axial portions upon which wheels are mounted, and the other unit comprising a frame supported in connection with the rod of said unit and a wheel axle and wheels pivotally supported in connection with said frame in spaced relation to the rod thereof.

11. An apparatus of the class described comprising two wheel units, each of said units involving a clamp rod, means for increasing and decreasing the length of said rod, adjustable means at the end portions of said rod for clamping the same in connection with a suitable support, the rods of one of said units terminating at its ends in axial portions upon which wheels are mounted, the other unit comprising a frame supported in connection with the rod of said unit and a wheel axle and wheels pivotally supported in connection with said frame in spaced relation to the rod thereof, and other means on said frame for engaging the support in connection with which said unit is mounted.

In testimony that I claim the foregoing as my invention I have signed my name this 3rd day of November, 1930.

OTTO C. LARSON.